United States Patent
Barlett et al.

(10) Patent No.: US 7,389,575 B2
(45) Date of Patent: Jun. 24, 2008

(54) METHOD OF MANUFACTURING PERMANENTLY MAGNETIZED ELEMENTS

(76) Inventors: Ernest Ross Barlett, 1492 Rusholme Crescent, Burlington, Ontario (CA) L7M 1M6; Donna Darlene Barlett, 1492 Rusholme Crescent, Burlington, Ontario (CA) L7M 1M6

( * ) Notice: Subject to any disclaimer, the term of this patent is extended or adjusted under 35 U.S.C. 154(b) by 488 days.

(21) Appl. No.: 11/170,106

(22) Filed: Jun. 30, 2005

(65) Prior Publication Data

US 2007/0000115 A1      Jan. 4, 2007

(51) Int. Cl.
*B23P 17/00*      (2006.01)
(52) U.S. Cl. .................. 29/412; 29/417; 29/603.08; 29/603.13; 29/458; 434/72; 40/124.04
(58) Field of Classification Search .............. 29/603.08, 29/603.13, DIG. 95, 412, 414, 417, 458; 40/124.04, 600, 711; 434/72
See application file for complete search history.

(56) References Cited

U.S. PATENT DOCUMENTS

| | | | |
|---|---|---|---|
| 2,941,314 A | 6/1960 | Schweiger | |
| 3,659,353 A | 5/1972 | D'Agrosa | 35/16 |
| 3,811,977 A * | 5/1974 | Kramer | 156/108 |
| 4,017,986 A * | 4/1977 | Miller | 434/73 |
| 4,427,481 A * | 1/1984 | Smith et al. | 156/306.6 |
| 4,806,102 A | 2/1989 | Pedersen et al. | 434/80 |
| 5,505,620 A | 4/1996 | Barlett | 434/73 |
| 5,869,148 A | 2/1999 | Silverschotz et al. | 427/549 |
| 6,347,469 B1 * | 2/2002 | Huellinghoff et al. | 40/600 |
| 6,506,056 B1 * | 1/2003 | DeMedio | 434/72 |
| 6,782,119 B1 * | 8/2004 | Barlett | 382/113 |
| 2004/0247366 A1 * | 12/2004 | Crum | 400/621 |

OTHER PUBLICATIONS

Arnold Magnetic Technolgies for Flexible Magnets—pp. 1 and 2 printed May 19, 2005.

* cited by examiner

*Primary Examiner*—Jermie E Cozart

(57) ABSTRACT

There is disclosed a method of manufacturing a plurality of removable permanently magnetized elements from a substrate comprising ferrite material. The method prints symbol images on the substrate with an offset, automatic sheet-fed press, and die cuts the symbol images on the substrate with an automatic sheet-fed die cutter to form a plurality of elements forming portions of the substrate. Thereafter, the method magnetizes the ferrite material to permanently magnetize the substrate and form the plurality of permanently magnetized elements. The method reduces wastage, permits for improved substrate registration, more accurate symbol placement on the substrate, higher production speeds, and reduced labor costs.

6 Claims, 2 Drawing Sheets

METHOD OF MANUFACTURING PERMANENTLY MAGNETIZED ELEMENTS

FIELD OF THE INVENTION

The present invention relates to a method of manufacturing magnetic elements made from sheet of magnetizable material.

BACKGROUND OF THE INVENTION

Sheet permanent magnet material is a well-established commercial product, and usually is made by mixing powdered high-permeability ferrite material into a uniform mixture with a suitable settable plastic vehicle. The mixture is converted into strip or sheet form, and the plastic vehicle is set to provide a permanent stable product that usually is somewhat flexible, and that can readily be handled and made into elements of any desired shape by cutting and/or stamping. The ferrite material is permanently magnetized so that the resulting elements can act individually as permanent magnets. The magnetic field of this material is of sufficient strength that the elements will adhere to a magnetizable metal surface, such as the surface of an iron or steel sheet, even through a sheet of paper or thin cardboard. A popular application of such materials is thin, flat magnets having on what is called for convenience in description their outer surface a decorative pattern and/or information, such as advertising. These magnets are adherable to the sheet steel door of a refrigerator, where they can also be used to hold sheets of paper, etc. thereon. Ferrites and the resultant sheet materials are inherently somewhat dark in colour, and therefore it is usual to cover the sheet outer surface with a thin layer of a lighter coloured material, usually a plastics material, on which the decorative patterns etc. can be printed. Another application for these elements is in a space planning kit as disclosed in my U.S. Pat. No. 5,505,620 issued Apr. 9, 1996.

A current method of manufacturing these magnetic elements involves the first step of screen printing symbols representative of the space planning elements onto a sheet of magnetic material. The next step is to is die cut or stamp out the elements along the symbol edges. While this two step process appears to be simple, it is a rather involved and requires considerable care by an operator to minimize wastage or scrap.

In the screen printing step a film is first produced of the desired image. A printing screen is then "shot" to have the image transferred to a screen. The non-image area is blocked out to prevent ink from being "pushed" through to the sheet. The screen is positioned on a press relative to registering stops that are used to hold the material in a set placement. If the screen press has a steel bed press surface, the user has to position an insulating sheet on the bed to prevent the magnetic sheet from interacting with the steel bed and interfering with proper positioning prior to printing. Ink is poured upon the screen after determining the proper viscosity for the desired resolution of the print image. After this set-up process, the magnetic substrate sheet is positioned against the register stops, and the print machine is activated, whereby the screen is automatically lowered, a squeegee is dragged over the screen, pushing ink onto the substrate. The screen is then lifted, and the process is repeated. The printed sheets are hand-removed, and placed on large drying racks, then stacked for transportation to a die cutter.

This screen printing step is cost efficient for a low number of sheet printing runs as compared to offset-press printing which has a cost benefit for sheet printing runs at around 300 sheets and up for each set-up. However, screen printing is slow and depending upon the resolution of the image needed, the screen image tends to get blocked up with dried ink, and has to be cleaned repeatedly. Further the above set-up procedure has to be repeated for each colour of a multi-coloured job, furthering the potential for waste or scrap. In this process, the amount of waste product becomes dependent on the skill of the operator particularly during the positioning of the sheet with the registering stops. The registration of the sheet during printing is critical and must always be in the same place for every print. If not, the sheet material is wasted during the die-cutting of the sheet as the precise location of the die cutting does not align with the screen printing borders for the symbols.

This screen printing step is manual and the operator requires, and acquires, a skill to accurately carry out the process. After a few set-ups, the monotony of the procedure results in the chances of operator error increasing with each sheet printed.

Further for multi-coloured projects that require consistency from colour-to-colour to get the image quality desired, the registration issues are more compounded when compared with one-colour jobs.

Because of the force needed to push the ink through the screen, the sheet may also be subject to stretching, which affects the image quality and accuracy when the sheet is die-cut.

After the screen print process, the printed sheet is sent to the die-cutters where the setup consists of installing a complex patterned die and the die is set to cut against the register or a "feed-corner" of the sheet. This is theoretically the exact same position that the screen printer used. This is where the registration inconsistencies and material deformation becomes apparent from sheet to sheet printed. In some instances this inconsistency in registration has resulted in scrapping as much as 10-15% of the printed sheets. The die cutting process is also a manual fed process. Due to the magnetic properties of the sheet, the die cutting step is subject to the same problematic issue with a steel bed as discussed above in the screen printing step.

An in-line, high speed manufacturing process of magnetic products is disclosed in U.S. Pat. No. 5,869,148 issued Feb. 9, 1999 to Silverschotz et al. This in-line process takes a substrate and applies printing to the substrate. The ink is dried and the substrate is scored. Next a magnetic slurry is applied to the substrate over the printing. The magnetic slurry is then magnetized and the sheets are cut to desired dimensions. This high speed manufacturing process requires, in addition to know how of printing and scoring, the know how of making the substrate into a magnetic substrate by the application of the magnetic slurry and subsequent magnetization of the substrate. It is a more complex and costly procedure for manufacturers of mid size and small runs who find it more practical to acquire sheets of permanent magnet materials and then screen print and die cut these sheets.

BRIEF DESCRIPTION OF THE INVENTION

The present invention relates to a method of manufacturing a plurality of removable permanently magnetized elements from a substrate comprising ferrite material. The method comprises printing symbol images on the substrate with an offset, printing press, die cutting the symbol images on the substrate to form a plurality of removable elements forming portions of the substrate, and thereafter, magnetizing the ferrite material to permanently magnetize the substrate and form the plurality of removable permanently magnetized elements.

The method of the present invention reduces wastage associated with previous screen printing processes because the offset printing process permits for improved substrate registration and more accurate symbol placement on the substrate. By having the magnetizing step follow both the printing and die cutting steps, the offset printer and die cutter do not have to process a magnetized substrate which would be attracted to metallic elements in the press and die cutter. Further when the method involves working with a preformed substrate comprising the ferrite material, the method does not require a person performing the method to purchase equipment for manufacturing the magnetizable substrate making the process more cost effective.

BRIEF DESCRIPTION OF THE DRAWINGS

For a better understanding of the nature and objects of the present invention reference may be had by way of example to the accompanying diagrammatic drawings, in which.

DETAILED DESCRIPTION OF THE INVENTION

The method of the present invention has application in forming permanently magnetic elements suitable for many uses, such as, for example, toy elements, space planning elements, fridge magnet elements, advertising elements, message elements and the like.

Figure 1:
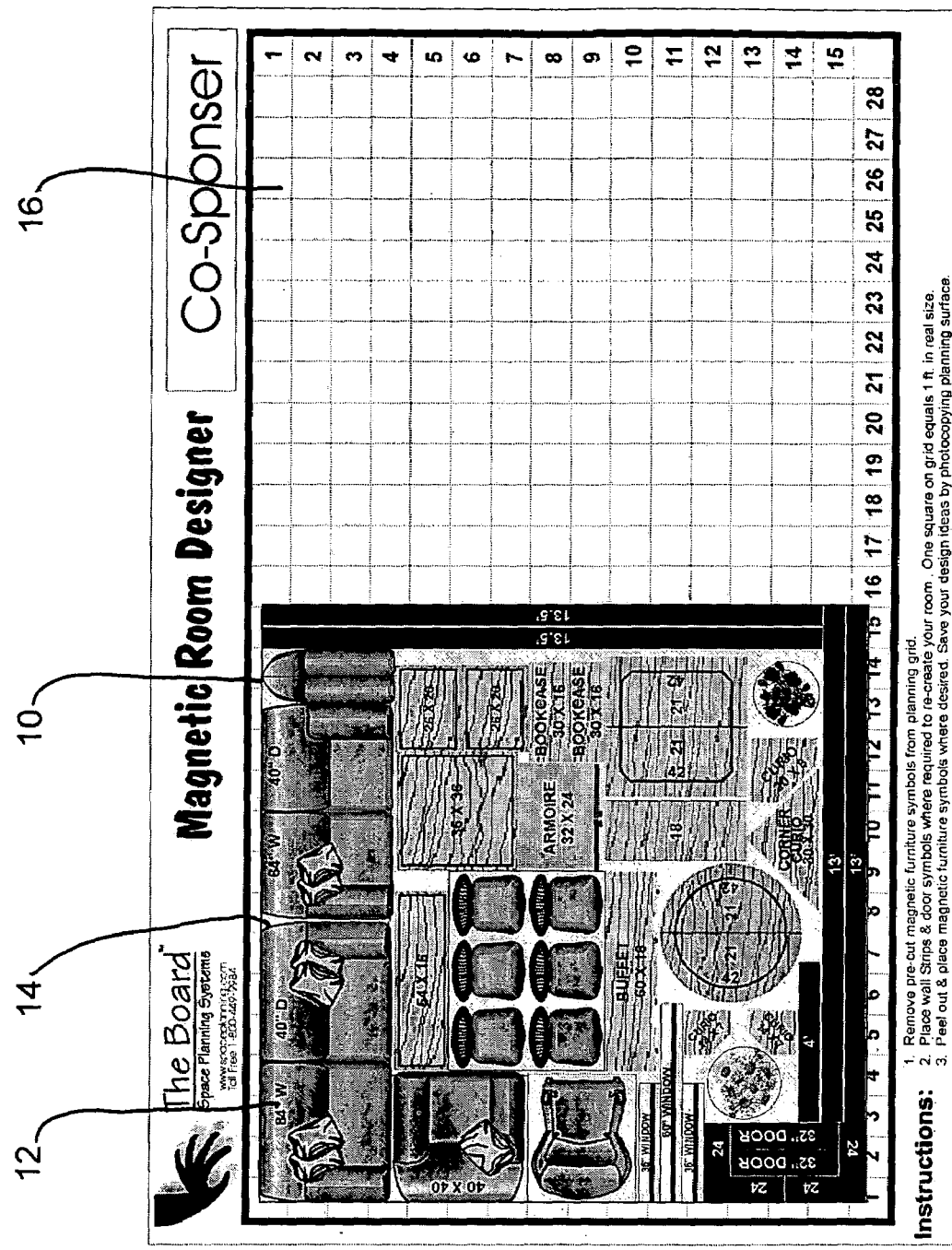
FIG. 1 is a plan view of an exemplary application for the substrate formed in accordance with the method of the present invention.

Referring to FIG. 1 there is shown one exemplary application of the present invention wherein a space planning substrate 10 is formed. The substrate 10 comprises a permanent magnet material having a plurality of magnetized elements 12 forming a portion of the substrate 10. Each of the magnetized elements 12 comprises a printed symbol having a score or die stamping cut surrounding the border of the symbol. This scoring is illustrated by numeral 14. The substrate 10 is shown placed on a magnetic receiving substrate 16. Substrate 16 comprises a layout board adapted to receive elements 12 removed from the substrate 10. It should be understood that the substrate 10 can be removed from the substrate 16 to provide a larger surface area on substrate 16 over which the elements 12 may be laid out. Substrate 16 may comprise a steel sheet adhered to a cardstock. Substrate 16 is not formed in accordance with the methods of the present invention.

The method of the present invention is utilized to manufacture the substrate 10. The steps in this method are shown in the flow chart of FIG. 2. First a sheet substrate is formed with a ferrite material at step 20. It should be understood that the formation of this sheet substrate with the ferrite material may be formed in house or may comprise a pre-formed substrate sheet acquired by a user who then executes the steps in boxes 22, 24, and 26 (to be described in more detail hereinafter) to form a plurality of permanently magnetized elements 12 from the substrate 10.

The substrate with the ferrite material is typically a flexible substrate wherein the substrate is formed by an extrusion process into a continuous sheet which is then cut and severed into the dimensions of the substrate utilized by the present invention. The substrate may also be manufactured by a calendering or rolling of pelletized compound between rollers to form the continuous sheet. Alternatively, the process may be formed as a combination of an extruder/calender process. The sheets contain a ferrite material and/or a rare earth ferrite material. The ferrite material is in a uniform mixture with a suitable setting plastic material that sets during the extrusion or calendering process. This material may be vulcanized to provide a rubber like backing. Such substrate material may be obtained from Flexmag Industries, a division of Arnold Magnetic Technologies located in Marrietta, Ohio, USA. In accordance with the method of the present invention, while the substrate sheet comprises the ferrite material, this ferrite material has not been magnetized at this stage in the method.

The next step in the method is to print symbol images on the substrate 22. The substrate is in sheet format and is printed in an offset, automatic sheet fed press. The automatic sheet fed press eliminates the requirement for an operator to orientate the sheets relative to the printing press and as a result a more consistent print of symbols 12 on the substrate 10 occurs. The printing technique used by the offset printer is not a screen printing technique and may comprise known printing techniques in the art such as, for example, lithography, flexography, gravure, inkjet, and xerographic and others. This offset, automatic sheet-fed press also permits for multi-coloured printing on a single pass. Currently, there are a number of different printing presses available in the art that can do anywhere from 2 to 12 colours in a single pass.

Figure 2:
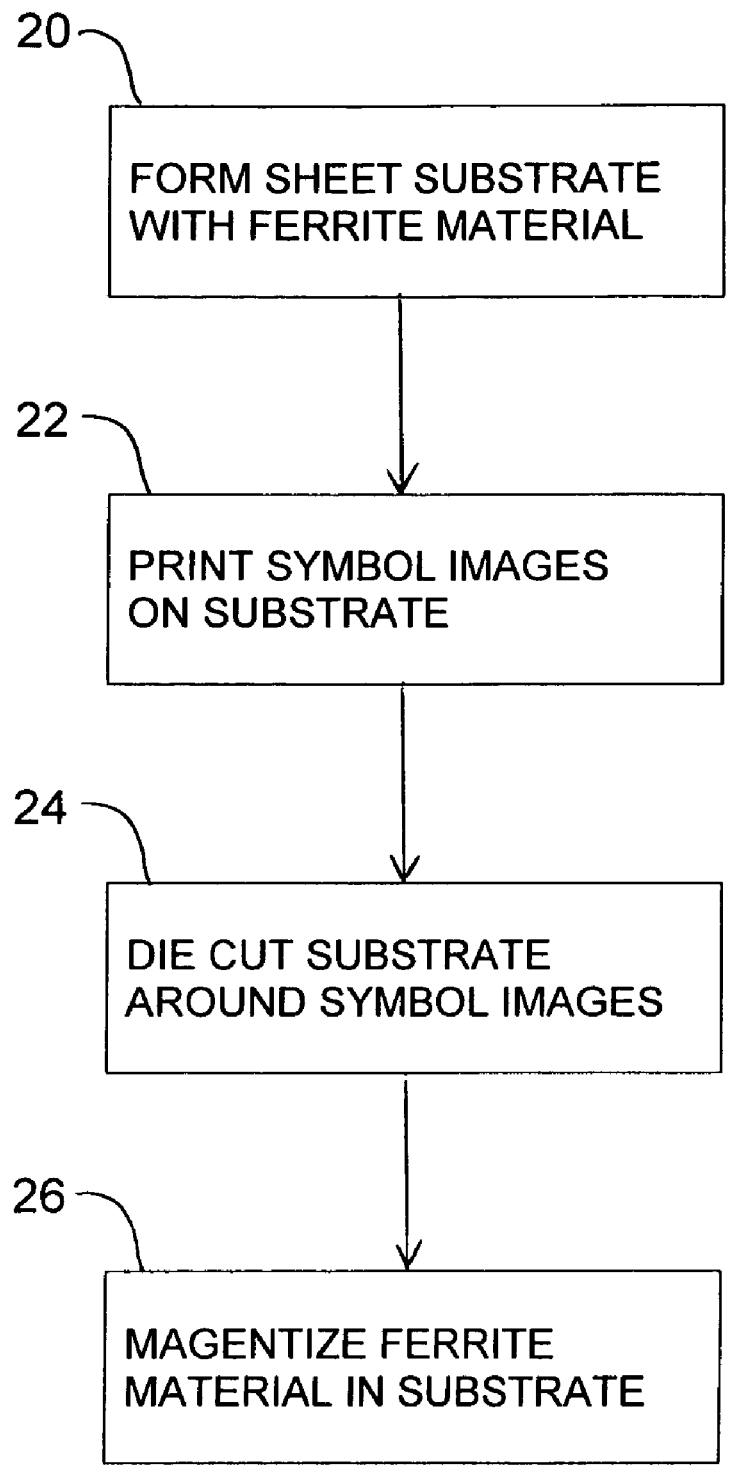
FIG. 2 is a flow chart showing the steps in formation of the substrate shown in FIG. 1.

The next step shown in FIG. 2 at 24 is the die cutting step of the substrate around the symbol images. In accordance with the present invention, it should be understood that the printing of the sheets can result in anywhere from 5 to 1000 or more sheets being printed, for example, and then these sheets can be transferred to the die press. The die press is also another automatic sheet press where a number of sheets can be loaded onto the press and moved into the press for cutting by the die. The die is also configured with cutting surfaces that correspond to scoring or partial cutting to be made into the substrate 10 about the symbols 12 printed thereon. This scoring is shown in FIG. 1 by reference numeral 14. Because the substrate 10 is a magnetizable substrate that has not yet been magentized, the sheets of the substrate may be readily processed by both the printer and die cutter without interfering with any steel or iron parts within either the printing press or the die cutter.

Next, at step 26 the sheets of the substrate are magnetized by a magnetizing machine so as to permanently magnetize the substrate and the elements formed in the substrate by the printing and the die cutting steps. The magnetizing machine suitable for magnetizing these substrates is a 15 or 25 inch wide, 12 poles per inch, magnetizing unit available from Flexmag Industries of Marrietta, Ohio, USA.

It should be understood that while the substrate 10 shown in FIG. 1 is a single substrate with space planning elements 12 contained thereon. These space planning elements 12 are removed from this substrate for application to a lay-out planning board, such as substrate 16, or to any other steel or iron substrate. However for the purposes of shipping and use of this particular space planning system shown in FIG. 1, it is more convenient to have the substrate contain the space planning elements.

While the invention has been described in terms of various specific embodiments, those skilled in the art will recognize that the invention can be practiced with modifications within the spirit and scope of the appended claims.

What is claimed is:

1. A method of manufacturing a plurality of removable permanently magnetized elements from a substrate comprising ferrite material, the method comprising the steps of:

(a) printing symbol images on the substrate with an offset, printing press, (b) die cutting the symbol images on the substrate to form a plurality of removable elements forming portions of the substrate, and
(c) magnetizing the ferrite material to permanently magnetize the substrate and form the plurality of removable permanently magnetized elements.

2. The method of claim 1 wherein the substrate comprises a discrete sheet.

3. The method of claim 1 wherein the printing of said symbol comprises one of an advertisement, message, or space planning object.

4. The method of claim 1 wherein said printing comprises one of lithography, flexography, gravure, inkjet, and xerographic.

5. The method of claim 1 wherein said sheet further comprises a rare earth material.

6. The method of claim 1 wherein the die cutting step utilizes an automatic sheet-fed die cutter and the printing step utilizes an automatic sheet-fed printing press.

\* \* \* \* \*